(12) United States Patent
Chen et al.

(10) Patent No.: US 8,993,052 B2
(45) Date of Patent: Mar. 31, 2015

(54) MANUFACTURING PROCESS FOR POROUS MATERIAL

(75) Inventors: Chi-Chang Chen, Taoyuan Hsien (TW); Ying-Da Luo, Taoyuan Hsien (TW); Bo-Jiun Shen, Taoyuan Hsien (TW); Hui-Ling Wen, Taoyuan Hsien (TW); Rong-Chang Liang, Cupertino, CA (US)

(73) Assignee: Delta Electronics, Inc., Taoyuan Hsien (TW)

( * ) Notice: Subject to any disclaimer, the term of this patent is extended or adjusted under 35 U.S.C. 154(b) by 255 days.

(21) Appl. No.: 13/174,287

(22) Filed: Jun. 30, 2011

(65) Prior Publication Data

US 2012/0034385 A1 Feb. 9, 2012

Related U.S. Application Data

(60) Provisional application No. 61/371,293, filed on Aug. 6, 2010.

(51) Int. Cl.
*D04H 1/00* (2006.01)
*D04H 1/42* (2012.01)
*C01B 31/30* (2006.01)

(52) U.S. Cl.
CPC . *D04H 1/42* (2013.01); *C01B 31/30* (2013.01)
USPC .......................................................... 427/228

(58) Field of Classification Search
USPC .......................................................... 427/226
See application file for complete search history.

(56) References Cited

U.S. PATENT DOCUMENTS

| 5,507,899 A | * | 4/1996 | Watanabe et al. ............. 156/154 |
| 2003/0124414 A1 | * | 7/2003 | Hertel et al. ..................... 429/44 |
| 2004/0157320 A1 | * | 8/2004 | Andreoli et al. ............ 435/287.2 |
| 2005/0214539 A1 | * | 9/2005 | Ying et al. ..................... 428/408 |
| 2008/0152577 A1 | * | 6/2008 | Addiego et al. ............... 423/460 |

* cited by examiner

*Primary Examiner* — Robert Vetere
(74) *Attorney, Agent, or Firm* — Muncy, Geissler, Olds & Lowe, P.C.

(57) ABSTRACT

A continuous process for manufacturing a porous material is provided. The process includes the steps of mixing a non-ionic surfactant with a precursor of a carbonaceous material to form a mixture comprising a continuous phase and a liquid crystalline mesophase comprising the non-ionic surfactant, wherein the precursor is essentially located in the continuous phase, coating or depositing the mixture onto a non-woven substrate, drying or heating the mixture, and converting the precursor to form a polymer.

23 Claims, 8 Drawing Sheets

MANUFACTURING PROCESS FOR POROUS MATERIAL

CROSS REFERENCE TO RELATED APPLICATIONS

This application claims the benefit of U.S. Provisional Application No. 61/371,293, filed on Aug. 6, 2010, the entirety of which is hereby incorporated by reference herein.

BACKGROUND OF THE INVENTION

1. Field of the Invention

The present invention relates to a continuous process for manufacturing a porous material, and in particular, to a continuous process for manufacturing a porous material using template techniques in a roll-to-roll manner.

2. Description of the Related Art

Generally, porous materials are materials with porous structures. According to International Union of Pure and Applied Chemistry (IUPAC), porous materials can be divided into three types, such as microporous, mesoporous, and macroporous materials. The microporous materials comprise pores of diameters substantially less than 2 nm, the macroporous materials comprise pores of diameters substantially greater than 50 nm, and the mesoporous materials comprise pores of diameters among 2-50 nm.

Surfactants typically comprise organic amphiphilic molecules having hydrophilic and hydrophobic groups and can be dissolved in organic solutions and aqueous solutions. When surfactant concentration in water is low, molecules of the surfactants will be located at the interface between air and water. When surfactant concentration in water is increased to a level causing saturated absorption at an interface between air and water, the surfactants not absorbed at the interface will aggregate with each other to make the hydrophilic ends face outward and contact with water molecules to reduce a contact area between the water molecules and the hydrophobic groups. The surfactant aggregates are so-called "micelle," and a surfactant concentration when the micelle is formed is defined as a critical micelle concentration (CMC).

A hydrophilic-lipophilic balance (HLB) of a surfactant is the hydrophilic degree of the surfactant. A surfactant with higher HLB value has higher hydrophilicity. For example, surfactants with HLB values of 8 or higher have high water solubility.

Since the solution concentration is greater than the critical micelle concentration, surfactant molecules will aggregate to form the micelle. Although the micelle is typically formed in a spherical shape, the size and shape of the micelle can be gradually changed in accordance with variations in concentration and temperature. In addition, the size and shape of the micelle are also influenced by the chemical structure and molecular weight of the surfactant. Based on formation conditions and compositions, liquid crystals comprise thermotropic liquid crystals and lyotropic liquid crystals. The thermotropic liquid crystals are formed due to temperature variations and the lyotropic liquid crystals are formed due to concentration variations.

Based on the organization of molecules or surfactant aggregates, liquid crystals comprise smectic and nematic mesophase. In the nematic phase, all molecules or surfactant aggregates are aligned approximately parallel to each other, with only a one-dimensional (orientational) order. In smectic phase, all molecules or surfactant aggregates exhibit both (two-dimensional) positional and orientational order.

In the prior art, one of the manufacturing processes for ordered mesoporous materials uses various surfactants as structure-directing agents, or so-called templates. The surfactants can be, for examples, triblock copolymers, diblock copolymers or ionic surfactants. The above method also uses alkoxides as precursor to synthesize metal oxides or hydroxides by a sol-gel technique. Alternatively, the above method may use carbonaceous monomers or oligomers as precursors of carbons to mix with surfactants and then the surfactants are removed as the surfactants are orderly arranged and the precursors are polymerized. The obtained polymers are then carbonized at a high temperature such that highly ordered mesoporous carbons are obtained. However, the research to date about formation of the mesoporous materials mainly focuses on changing the synthesis conditions of the precursors or the materials. For example, U.S. Pat. Nos. 5,057,296; 5,108,725; 5,102,643; and 5,098,684 disclose using ionic surfactants as a template for manufacturing porous materials, wherein pore sizes thereof are greater than 5 nm. However, the formed mesoporous structures are not stable.

The conventional manufacturing processes for highly ordered mesoporous materials are typically template-directed synthesis. The methods thereof can be divided into hard template methods and soft template methods according to features and restrictions of the template used therein. Since Kresge et al. disclosed a synthesis method for forming mesoporous silica in 1992 (C. T. Kresge, M. E. Leonowicz, W. J. Roth, J. C. Vartuli, and J. S. Beck, "Ordered mesoporous molecular sieves synthesized by a liquid-crystal template mechanism" Nature, vol 359, no. 6397, pp. 710-712, 1992), research about manufacturing mesoporous materials by template methods have been developed in the last decade. More precisely, research about manufacturing mesoporous materials by template methods that mainly focus on selections of surfactants and the conditions of material synthesizing has been carried out. For the soft template method, through selecting the surfactants and adjusting the synthesis conditions, the surfactant as a structure-directing agent will self-assemble into a highly ordered liquid crystalline phase while the concentration of the surfactant is greater than the critical micelle concentration; thereby forming various types of highly ordered mesoporous channels such as MCM-41, SBA-15 and MCM-50 having a two dimensional high symmetry, and KIT-5, SBA-16, SBA-11, SBA-2, MCM-48, etc. having a three dimensional high symmetry. For the hard template method, a previously prepared mesoporous silicon dioxide, such as SBA-15 is used as a template to prepare reversed mesoporous materials. After mixing carbon precursors with SBA-15, the carbon precursors are converted to carbon. The silicon dioxide in the obtained product is removed by using hydrofluoric acid or strong bases and then the ordered mesoporous carbon named as CMK-3 is obtained. Although highly ordered mesoporous materials having microstructures can also be obtained, the cost of the hard template method is high, and the structures of the obtained materials are reversed mesoporous structure.

The highly ordered mesoporous materials synthesized by using surfactants as structure-directing agents have characteristics such as high specific surface areas, uniform and adjustable pore sizes, and regular pore channel arrangements such that high value in applications such as separation, catalyst, electromagnetic materials, and chemical sensing can be seen, wherein the representative materials are mesoporous silicon dioxides.

The evaporation induced self-assembly (EISA) method is a process to obtain a highly ordered arrangement of the surfactants. Due to the slow evaporation of solvents, the surfactants can be thus formed with highly ordered liquid crystalline mesophases. An amount of the prepared materials in each batch must be limited in order to obtain ordered structure. Because of the multistep and nonequilibrium of evaporating and self-assembly, the synthesis space is limited in a batch process. The solvent evaporating path through the solution-air interface and the gradient of solution concentration need to be well controlled to obtain an ordered structure. Therefore, the EISA process is preferred to be conducted in dishes rather than beakers. Due to the above mentioned limitations, the batch process cannot satisfy the need of mass production.

Chinese Patent No. 101244818A discloses using a polyurethane sponge as a skeleton, wherein a mixture comprising precursors and surfactants is coated over the skeleton for solvent evaporation induced self-assembly. Thereafter, the polyurethane sponge is thermally treated to achieve mass production of mesoporous carbon by batch process. This process still can not meet the requirement of automated mass production. Until now, it is still an unsolved problem to perform mass production with EISA process via continuous or automated routes.

Accordingly, with a scale-up design in a conventional batch process, there are disadvantages of reaction uniformity and unstable quality.

SUMMARY OF THE INVENTION

A roll-to-roll method has been incorporated with a template method to use a structure-directing agent for synthesizing directional or regular porous materials.

In one embodiment, a continuous process for manufacturing a porous material is provided. The process includes the steps of mixing a non-ionic surfactant with a precursor of a carbonaceous material to form a mixture comprising a continuous phase and a liquid crystalline mesophase comprising the non-ionic method, coating or depositing of the mixture onto a non-woven substrate is carried out and then drying or heating of the mixture. The precursor is then converted to form a polymer.

In one embodiment of the present invention, the manufacturing process further includes steps of carbonizing the polymer to form porous carbon.

In another embodiment of the present invention, the manufacturing process further includes steps of adding a metal precursor or metal powder into the mixture so as to obtain a carbon-metal composite or a carbon-metal oxide composite.

In still another embodiment of the present invention, at least one of the carbon-metal composite and the carbon-metal oxide composite is selected from the group consisting of Ti, Pt, Ag, Au, Al, Ru, Fe, V, Ce, Zn, Sn, Si, W, Ni, Co, Mn, In, Os, Cu, Nb, and oxides thereof.

In a further embodiment of the present invention, the liquid crystalline mesophase is a smectic phase or a smectic hexagonal phase. The liquid crystalline mesophase is in the form of a column having a diameter from about 2 nm to about 20 nm.

In a still further embodiment of the present invention, the non-ionic surfactant has a hydrophilic lipophilic balance (HLB) value from 5 to 24. More preferably, the non-ionic surfactant has an HLB value from 17 to 24. More preferably, the non-ionic surfactant has an HLB value from 6 to 10.

In further still another embodiment of the present invention, the mixture comprises two continuous phases, or a continuous liquid crystalline mesophase and a continuous non-liquid crystalline phase.

The manufacturing process may further include steps of coating or depositing the mixture onto the non-woven substrate in a roll-to-roll manner, and removing the non-ionic surfactant from the polymer, wherein removing the non-ionic surfactant comprises heating the polymer.

Preferably, the mixture is coated or deposited onto the non-woven substrate by casting, impregnation, spraying, dipping, gravure, doctor blade, slot, slit, curtain, reverse or transfer coating, or printing.

Preferably, the precursor of the carbonaceous material comprises a carbon precursor, wherein the carbon precursor is selected from the group consisting of phenolic resin, furfural derivative polymer, pitch, oxidized polystyrene, polyacrylonitrile, polyvinyl alcohol, polyvinyl chloride, and combinations thereof.

Preferably, the manufacturing process further includes steps of adding carbon nano-tube, carbon black, graphite or graphene into the mixture to form a composite.

Preferably, the non-ionic surfactant comprises a block, graft, or branch copolymer.

More preferably, the non-ionic surfactant is selected from the group consisting of ethylene oxide (EO) copolymer, propylene oxide (PO) copolymer, butylene oxide copolymer, vinyl pyridine copolymer, vinyl pyrrolidone, epichlorohydrin copolymer, styrene copolymer, acrylic copolymer, and combinations thereof.

Preferably, the molecular weight of the non-ionic surfactant is between 500 and 20000. More preferably, the molecular weight of the non-ionic surfactant is between 5000 and 15000.

Preferably, the non-woven substrate is selected from the group consisting of polyvinyl derivative, polyester, polycarbonate, polyamide, polyimide, cellulose, polyolefin, polysulfone, polyethylene terephthalate (PET), polypropylene (PP), halogenated derivatives thereof, and composites thereof.

Preferably, the manufacturing process further includes steps of adding a swelling agent into the mixture, wherein the swelling agent is selected from the group consisting of 1,3, 5-trimethylbenzene (TMB), cholesterol, polystyrene, polyethers, polyetheramines, polyacrylate, polyacrylic and derivatives thereof.

Preferably, the manufacturing process further includes steps of adding a conductive agent into the mixture.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, where.

DETAILED DESCRIPTION OF THE INVENTION

The following description is made for the purpose of illustrating the general principles of the invention and should not be taken in a limiting sense.

Manufacturing of Porous Materials

Synthesis methods capable of mass production are provided to synthesize the porous materials with template methods. Generally, according to the present invention, the continuous processes for manufacturing a porous material comprise the steps of mixing a non-ionic surfactant with a precursor of carbonaceous material to form a mixture and coating or depositing the mixture onto the non-woven substrate in a roll to roll manner followed by performing drying or heating. In addition, depending on the porous materials to be formed, a thermal treatment may optionally be performed after the drying or heating process.

Figure 1:
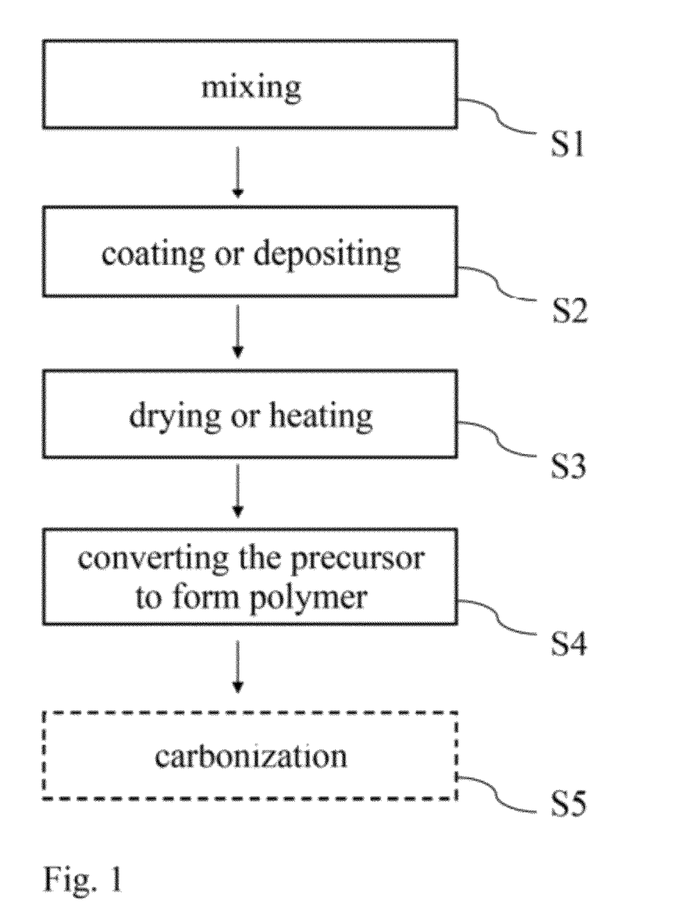
FIG. 1 is a flow chart of a continuous process for manufacturing a porous material in accordance with one embodiment of the present invention.

FIG. 1 is a flow chart showing the continuous process for manufacturing a porous material of the invention. As shown in FIG. 1, in a raw material mixing step S1, non-ionic surfactants for forming a template and precursors of carbonaceous material for forming a material are mixed to form a mixture. The mixture comprises a continuous phase and a liquid crystalline mesophase comprising the non-ionic surfactant, wherein the precursor is essentially located in the continuous phase;

The ordered structure in liquid crystalline mesophases extends up to the entire domain. The domain size may be several micrometers.

Preferably, the liquid crystalline mesophase is a smectic phase. More preferably, the liquid crystalline mesophase is a smectic hexagonal phase. A column of a smectic hexagonal phase has a diameter from about 2 nm to about 20 nm.

Preferably, the mixture comprises two continuous phases or a continuous liquid crystalline mesophase and a continuous non-liquid crystalline phase.

Figure 2:
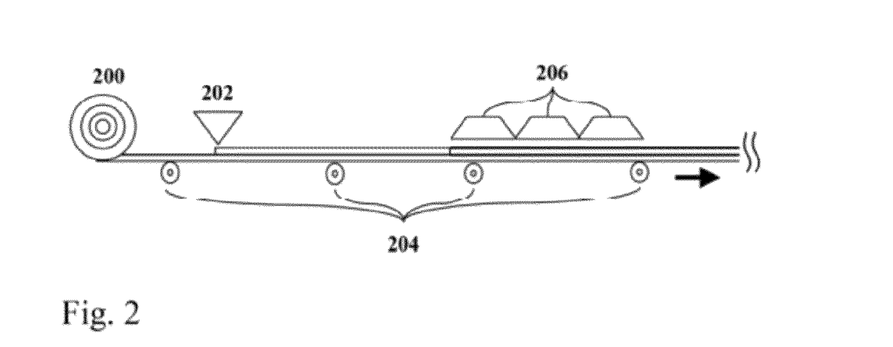
FIG. 2 is a schematic diagram showing a continuous roll-to-roll coating process of the invention.

Next, in a coating or depositing step S2, as shown in FIG. 2, the mixture is coated or deposited onto a non-woven substrate (e.g., a substrate 200) by a continuous process (e.g., performed by a coater 202). The non-woven substrate comprises polyvinyl, polyvinylenes, polyester, polycarbonate, polyamides, polyimides, cellulose, polyolefines, polysulfone, and halogenated derivatives thereof or composites thereof. After the coating or depositing step, the precursor of the carbonaceous material is located in the continuous phase comprising the non-ionic surfactant and can be converted into the porous material. Methods for the conversion way can be crosslinking, polymerization, carbonization, or combinations thereof. In addition to the above coating or depositing step, the mixture is applied onto the non-woven substrate by casting, impregnation, spraying, dipping, gravure, doctor blade, slot, slit, curtain, reverse or transfer coating, or printing.

The precursors of the carbonaceous materials can be phenolic resin, furfural derivatives polymer, pitches, oxidized polystyrene, polyacrylonitrile, polyvinyl alcohol, polyvinyl chloride, or combinations thereof.

As shown in FIG. 1, after the coating or depositing step, the non-woven substrate is conveyed to the next station by a continuous roll-to-roll process (e.g., a roll-to-roll type conveyer 204 in FIG. 2) with adjustable speed to facilitate control of the reaction. In a drying or heating step S3, the non-ionic surfactant is self assembled to form an orderly arranged liquid crystalline mesophase with a controlled conveying time.

The non-ionic surfactant can be block, graft or branch copolymer. In addition, the non-ionic surfactant is selected from the group consisting of ethylene oxide (EO) copolymer, propylene oxide (PO) copolymer, butylene oxide copolymer, vinyl pyridine copolymer, vinyl pyrrolidone, epichlorohydrin copolymer, styrene copolymer, acrylic copolymer, and combinations thereof.

Preferably, the molecular weight of the non-ionic surfactant is between 500 and 20000. More preferably, the molecular weight of the non-ionic surfactant is between 5000 and 15000.

Preferably, the non-ionic surfactant has a HLB value from 5 to 24. More preferably, the non-ionic surfactant has an HLB value from 17 to 24 (e.g., F127) or from 6 to 10 (e.g., P123). Both F127 and P123 are commercially available from BASF® Corp.

As shown in FIG. 1, after the continuous process of step S3, a converting step of S4 is applied to make the precursor of carbonaceous material form a polymer via cross-linking or polymerization reaction (e.g., performed by a heater 206). A porous polymer can be obtained after removal of the non-ionic surfactants.

As shown in FIG. 1, after the converting step S4, a carbonization step of S5 can be optionally performed to obtain porous carbon. For example, when preparing the porous carbon, the surfactants can be removed by successive thermal treatments under a low temperature, and then the temperature is elevated to carbonize the precursors. Furthermore, chemical activation, physical activation or combination thereof can be performed on the porous carbon to enhance the porosity.

The process of the present invention is not limited to synthesize the specific materials, and a porous polymer, carbon or the like can also be manufactured with a template method.

According to another preferred embodiment, a phenolic resin is used as precursors of carbonaceous material for forming carbon and can be incorporated with P123 or F127 (triblock copolymer produced by BASF® Corp.) to form polymer or porous carbon. According to preferred embodiments, metal or metal oxide-carbon composite material can be synthesized. For example, in precursors for synthesizing carbon, precursors $TiCl_4$ for forming $TiO_2$ are added to the above material, and the porous carbon-$TiO_2$ composite materials are obtained after graduated atmosphere control of high-temperature treatments. The metal precursors can also be added into the mixture to obtain the carbon-metal or carbon-metal oxide composite, wherein the carbon-metal or carbon-metal oxide is selected from the group consisting of Ti, Pt, Ag, Au, Al, Ru, Fe, V, Ce, Zn, Sn, Si, W, Ni, Co, Mn, In, Os, Cu, Nb, and oxides thereof.

According to a preferred embodiment, a swelling agent can be added into the mixture in the step S1 to form porous materials with greater pore sizes. For example, 1,3,5-trimethylbenzene (TMB) can be used as a swelling agent to control the swelling degree of the hydrophobic part of the micelle structure, thus enlarging the pore size of the porous material. In addition, another compound such as cholesterol, polystyrene, polyethers, polyetheramines, polyacrylate, polyacrylic or derivatives can be added to produce strong affinities at the hydrophobic end of the surfactants, thereby introducing it into the structure-directing agent to achieve the swelling effects.

In addition to the above processes, according to preferred embodiments, conductive agents can be further added in the manufacturing process to increase conductivity of the porous materials. According to preferred embodiments, carbon nano-tube, carbon black, graphite or graphene can be also added into the mixture of a non-ionic surfactant and a precursor. After converting the precursor and/or removing the non-ionic surfactant, the porous material with improved conductivity can be obtained.

The present invention provides two exemplified embodiments of manufacturing porous carbon using the non-woven substrate as follows.

Example 1

An alcoholic deposition solution is formed by mixing F127 ($EO_{106}PO_{70}EO_{106}$) and phenolic resin in ethanol to form a mixture. The mixture is deposited onto non-woven substrate of polyethylene terephthalate (PET). Then a drying step is applied to evaporate ethanol at 25° C. Then, a converting step is conducted at 100° C. to polymerize the phenolic resin. The composite of the polymer-deposited non-woven substrate is obtained.

Figure 3:
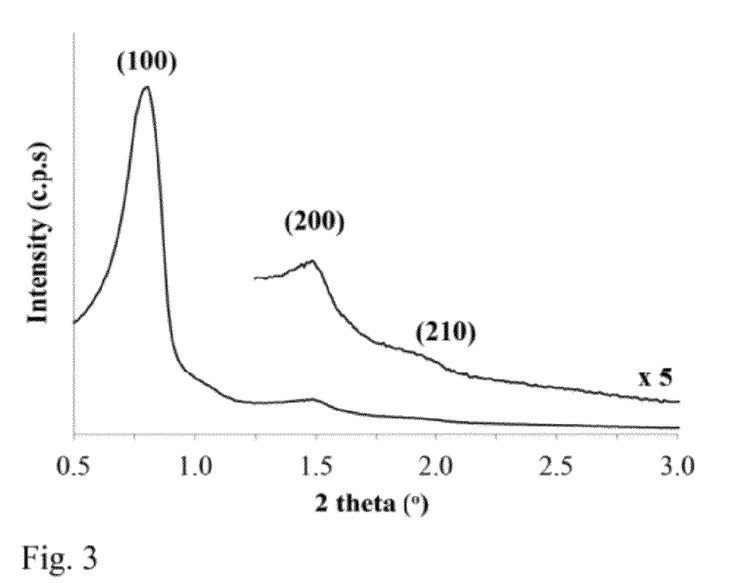
FIG. 3 shows a small-angle X-ray diffraction pattern of the porous carbon of the example 1.
Figure 4:
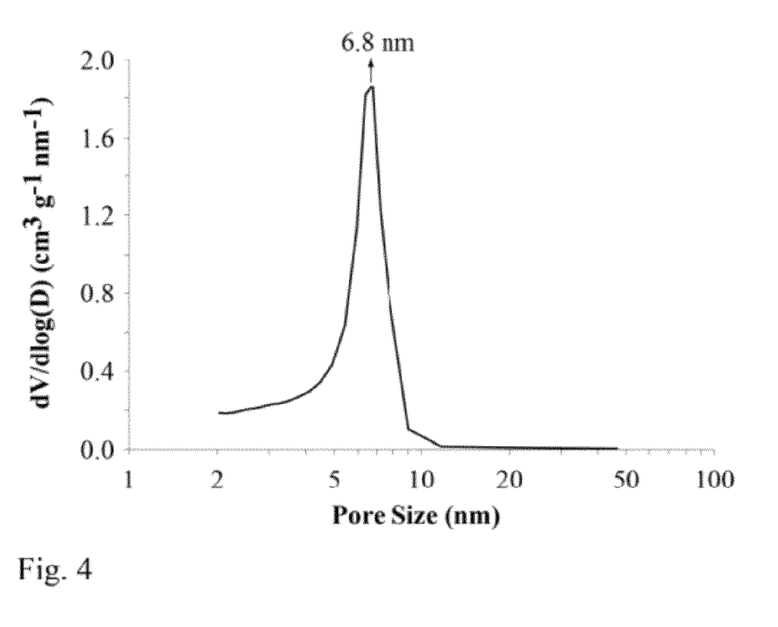
FIG. 4 is a plot for the pore size distribution of the porous carbon of the example 1.
Figure 5:
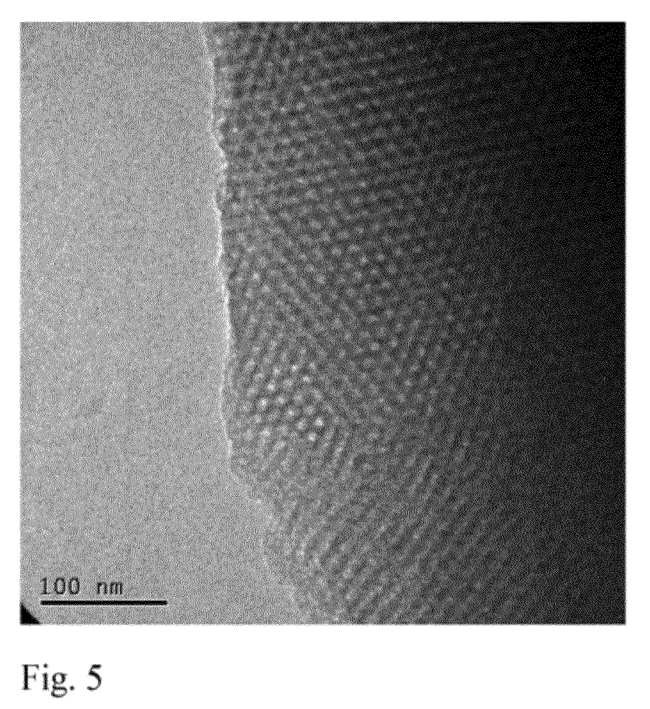
FIG. 5 is a transmission electron micrograph of the porous carbon of the example 1.

A carbonization process is carried out in a tubular furnace under $N_2$ flow at 700° C. for 3 hours to carbonize the polymer-deposited non-woven PET substrate. The porous carbon exhibits an ordered hexagonal structure as evidenced from FIG. 3. As shown in FIG. 4, the pore size distribution of the porous carbon is narrow and the specific surface area and pore diameter of the porous carbon are 678 $m^2/g$ and approximately 6.8 nm, respectively. FIG. 5 is a photograph of a transmission electron microscopy (TEM) of the ordered hexagonal structure of the porous carbon.

Example 2

A mixture of F127 and phenolic resin is deposited onto polypropylene (PP) non-woven substrate with the same procedure as in Example 1 to obtain the polymer-deposited PP non-woven composite.

Figure 6:
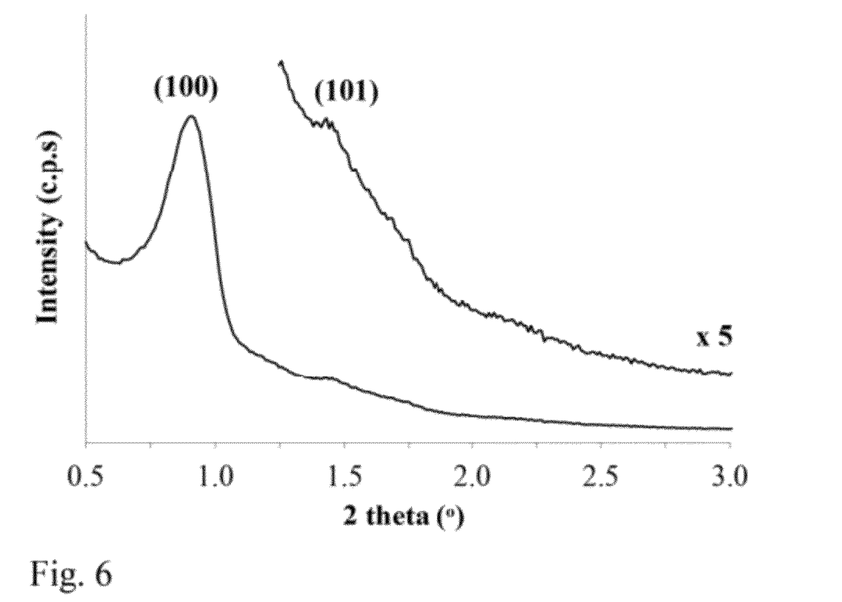
FIG. 6 shows a small-angle X-ray diffraction pattern of the porous carbon of the example 2.
Figure 7:
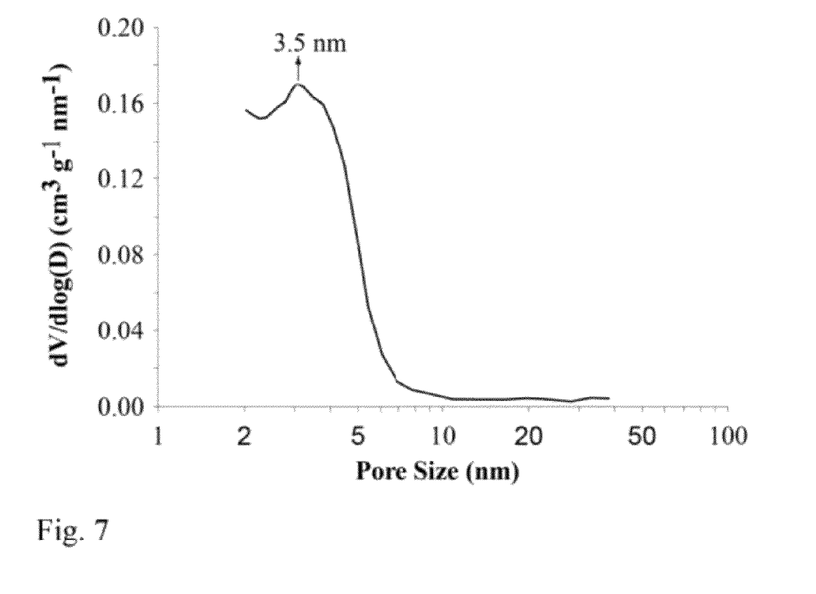
FIG. 7 is a plot for the pore size distribution of the porous carbon of the example 2.
Figure 8:
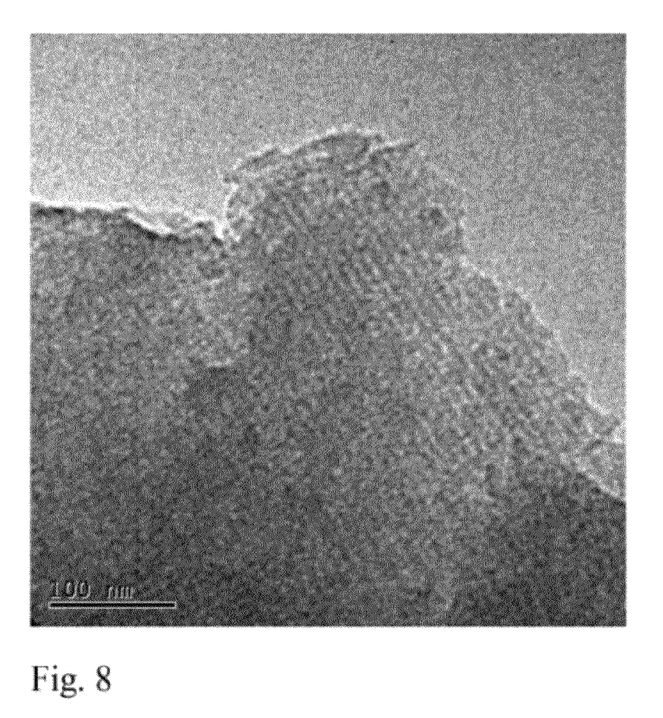
FIG. 8 is a transmission electron micrograph of the porous carbon of the example 2.

A carbonization process is carried out in a tubular furnace under $N_2$ flow at 700° C. to carbonize the polymer-deposited non-woven PP substrate. The porous carbon exhibits an ordered structure as evidenced from FIG. 6. The pore size distribution of the porous carbon (as shown in FIG. 7) and the specific surface area and pore diameter of the porous carbon are 492 $m^2/g$ and approximately 3.5 nm, respectively. FIG. 8 is a photograph of a transmission electron microscopy (TEM) of the ordered structure of the porous carbon.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A continuous process for manufacturing a porous material, comprising:
   mixing a non-ionic surfactant with a precursor of a carbonaceous material to form a mixture comprising a continuous phase and a liquid crystalline mesophase comprising the non-ionic surfactant, wherein the precursor is essentially located in the continuous phase;
   coating or depositing the mixture onto a non-woven substrate in a roll-to-roll manner;
   drying or heating the mixture; and
   converting the precursor to form a polymer,
   wherein the liquid crystalline mesophase is a smectic phase or a smectic hexagonal phase, and wherein the liquid crystalline mesophase is the form of a column having a diameter from about 2 nm to about 20 nm.

2. The continuous process of claim 1, further comprising carbonizing the polymer to form porous carbon.

3. The continuous process of claim 2, further comprising adding a metal precursor or metal powder into the mixture so as to obtain a carbon-metal composite or a carbon-metal oxide composite.

4. The continuous process of claim 3, wherein at least one of the carbon-metal composite and the carbon-metal oxide composite is selected from the group consisting of Ti, Pt, Ag, Au, Al, Ru, Fe, V, Ce, Zn, Sn, Si, W, Ni, Co, Mn, In, Os, Cu, Nb, and oxides thereof.

5. The continuous process of claim 1, wherein the non-ionic surfactant has a hydrophilic lipophilic balance (HLB) value from 5 to 24.

6. The continuous process of claim 1, wherein the non-ionic surfactant has a hydrophilic lipophilic balance (HLB) value from 17 to 24.

7. The continuous process of claim 1, wherein the non-ionic surfactant has a hydrophilic lipophilic balance (HLB) value from 6 to 10.

8. The continuous process of claim 1, wherein the mixture comprises two continuous phases, or a continuous liquid crystalline mesophase and a continuous non-liquid crystalline phase.

9. The continuous process of claim 1, further comprising removing the non-ionic surfactant from the polymer.

10. The continuous process of claim 9, wherein removing the non-ionic surfactant comprising heating the polymer.

11. The continuous process of claim 1, wherein the mixture is coated or deposited onto the non-woven substrate by casting, impregnation, spraying, dipping, gravure, doctor blade, slot, slit, curtain, reverse or transfer coating, or printing.

12. The continuous process of claim 1, wherein the precursor of the carbonaceous material comprises a carbon precursor.

13. The continuous process of claim 12, wherein the carbon precursor are selected from the group of phenolic resin, furfural derivative polymer, pitch, oxidized polystyrene, polyacrylonitrile, polyvinyl alcohol, polyvinyl chloride, or combinations thereof.

14. The continuous process of claim 1, further comprising adding carbon nano-tube, carbon black, graphite or graphene into the mixture to form a composite.

15. The continuous process of claim 1, wherein the non-ionic surfactant comprises a block, graft, or branch copolymer.

16. The continuous process of claim 1, wherein the non-ionic surfactant is selected from the group consisting of ethylene oxide (EO) copolymer, propylene oxide (PO) copolymer, butylene oxide copolymer, vinyl pyridine copolymer, vinyl pyrrolidone, epichlorohydrin copolymer, styrene copolymer, acrylic copolymer, and combinations thereof.

17. The continuous process of claim 1, wherein the molecular weight of the non-ionic surfactant is between 500 and 20000.

18. The continuous process of claim 1, wherein the molecular weight of the non-ionic surfactant is between 5000 and 15000.

19. The continuous process of claim 1, wherein the non-woven substrate is selected from the group consisting of polyvinyl derivative, polyester, polycarbonate, polyamide, polyimide, cellulose, polyolefin, polysulfone, polyethylene terephthalate (PET), polypropylene (PP), halogenated derivatives thereof, and composites thereof.

20. The continuous process of claim 1, further comprising adding a swelling agent into the mixture.

21. The continuous process of claim 20, wherein the swelling agent is selected from the group consisting of 1,3,5-trimethylbenzene (TMB), cholesterol, polystyrene, polyethers, polyetheramines, polyacrylate, polyacrylic, and derivatives thereof.

22. The continuous process of claim 1, further comprising adding a conductive agent into the mixture.

23. The continuous process of claim 1, wherein an ordered structure in the liquid crystalline mesophase extends up to the entire domain.

* * * * *